Nov. 17, 1936.   L. E. LA BRIE   2,060,877

BRAKE

Original Filed March 12, 1928   2 Sheets-Sheet 1

INVENTOR.
LUDGER E. LA BRIE
BY
ATTORNEY

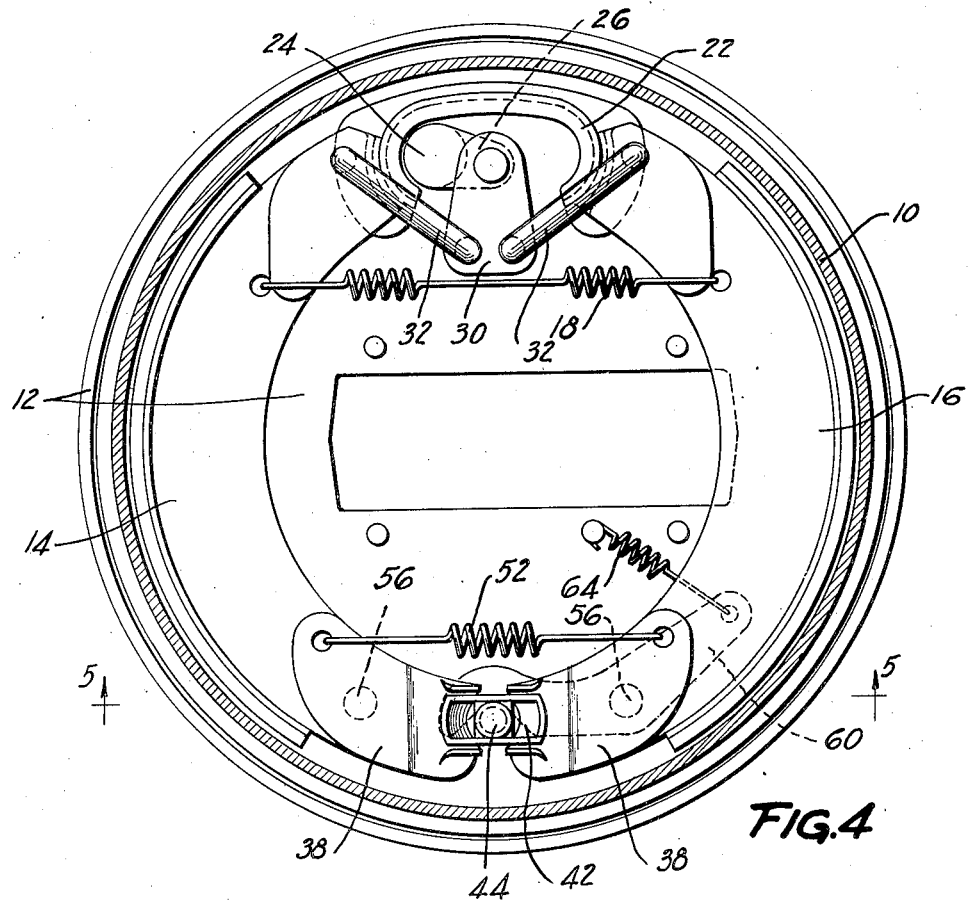
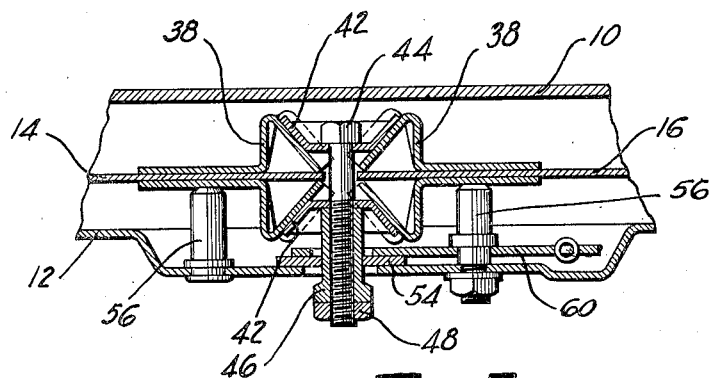

Patented Nov. 17, 1936

2,060,877

UNITED STATES PATENT OFFICE 2,060,877

BRAKE

Ludger E. La Brie, South Bend, Ind., assignor to Bendix Brake Company, South Bend, Ind., a corporation of Illinois Original application March 12, 1928, Serial No. 261,068. Divided and this application September 30, 1933, Serial No. 691,579.

10 Claims. (Cl. 188—79.5)

This invention relates to brakes, and is illustrated as embodied in an internal expanding brake for an automobile.

An object of the invention relates to providing the friction means of the brake with a simple and effective centering device, shown as acting on an improved adjustment connecting the shoes of the friction means. Preferably, the centering device is arranged across the brake from the anchorage, and comprises means such as a spring urging the adjacent portion of the friction means away from the anchorage, thereby holding the entire friction means under spring-loaded tension, to obviate rattles, etc.

Another feature of the invention relates to the construction and arrangement of the above-mentioned shoe adjustment, especially when combined with the centering means as shown, and comprises a simple wedge mechanism operable from outside the brake. Preferably the wedge surfaces on the shoes are provided by welding or otherwise securing to the opposite sides of the shoe webs, separately-formed steel stampings or similar members having triangular-section portions jointly forming the double wedges at the ends of the shoes.

The above and other objects and features of the invention, including novel leaf-spring steady rests and a simple shaft bearing for a brake backing plate, will be apparent from the following description of the illustrative embodiments shown in the accompanying drawings, in which:

Figure 4 is a section corresponding to Figure 1, but showing a different embodiment of the invention; and Figure 5 is a partial section on the line 5—5 of Figure 4, showing the centering and adjusting means.

Figure 1:
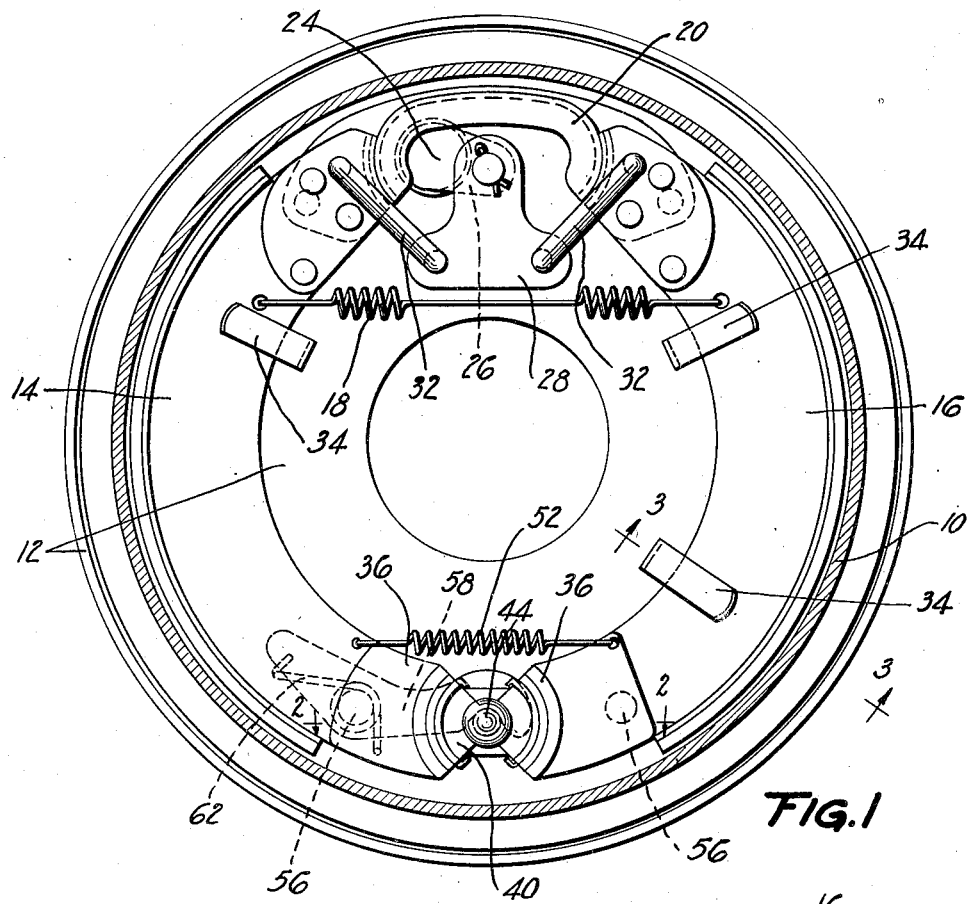
Figure 1 is a vertical section through a brake embodying one modification of the invention, just inside the head of the brake drum and showing the brake shoes in side elevation.
Figures 2, 3:
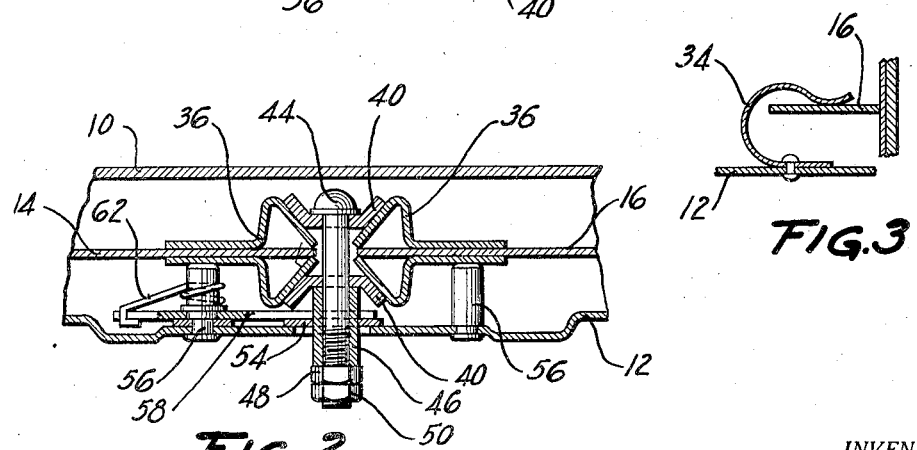
Figure 2 is a partial section on the line 2—2 of Figure 1, showing the novel centering and adjusting means.
Figure 3 is a partial section on the line 3—3 of Figure 1, showing one of the leaf springs.

In both embodiments, the brake includes a rotatable drum 10, at the open side of which is a support such as a backing plate 12, and within which is arranged the brake friction means. The friction means preferably includes a pair of shoes 14 and 16, one of which anchors when the drum is turning in one direction and the other of which anchors when the drum is turning in the other direction. A return spring 18 is shown tensioned between the shoes.

The illustrated anchorage is a hollow steel stamping 20 (Figure 1) or 22 (Figure 4), welded or otherwise secured to the brake backing plate 12, and more fully described (and claimed) in my copending application No. 261,068, filed March 12, 1928, of which the present application is a division.

The brake is shown applied, as explained more fully in my said parent application No. 261,068, by means such as a shaft 24, journaled in a support carried by the backing plate, and having a crank 26 connected by a stamping 28 (Figure 1) or 30 (Figure 4) to toggle links 32 connected to the shoes.

The brake of Figure 1 is shown provided with novel steady rests in the form of C-shaped leaf springs 34, riveted or otherwise secured to the backing plate 12 at their ends, and yieldingly engaging the shoe webs on the side opposite the backing plate.

The lower ends of the shoes are shown provided with pairs of triangular-section stampings 36, (Figure 1) and 38, (Figure 4), spot welded or otherwise secured to the opposite sides of the shoe webs and forming double wedge surfaces at the ends of the shoes. These wedge surfaces are curved conically, for pivotal engagement with novel transversely-movable stamped steel adjusting wedges 40 and 42, of corresponding shapes.

These wedges are operated by a bolt 44 having a head engaging one wedge and a thrust sleeve 46 engaging the other wedge and operated by a nut 48 threaded on the bolt, and having, if desired, a lock or jam nut 50. A spring 52 tensioned between the shoes holds them against the adjustment. The bolt 44 passes through an opening in the backing plate, which opening is closed by a sliding washer 54 sleeved on the member 46 and held against the backing plate by the centering lever described below.

The lower ends of the shoes are positioned laterally by steady rest posts 56 riveted or otherwise secured to the backing plate 12, and having rounded ends slidably engaging the stampings 36 or 38.

On one of the posts 56 is mounted novel centering means for the brake friction means, preferably including a centering lever 58 (Figure 1) or 60 (Figure 4) centrally pivoted on the post and formed at one end with a double-wedge centering surface seated over the sleeve member 46 of the brake adjustment, and acting through the brake adjustment to urge the adjacent portion of the friction means yieldingly downward away from the brake anchorage.

The lever 58 is actuated by a torsion spring 62 looped about the post 56 and engaging at its opposite ends the post 56 and the end of the lever 58. The lever 60 is actuated by a coil spring 64 tensioned between the backing plate 12 and the end of the lever 60.

By this means, the brake friction is constantly under a spring-loaded tension, being tensioned between the brake anchorage and the centering lever, which are on opposite sides of the brake.

While two illustrative embodiments have been described in detail, it is not my intention to limit the scope of the invention to those particular embodiments, or otherwise than by the terms of the appended claims.

I claim:

1. Centering means comprising, in combination, a wedge lever, a pivot on which the lever is mounted, and a spring looped about the pivot and acting on the lever.

2. A brake shoe having a stiffening web, and having secured to opposite sides of the web at the end of the shoe a pair of separately-formed members having triangular-section portions jointly forming a double wedge surface at the end of the shoe.

3. A brake comprising, in combination, a pair of shoes arranged end to end and having double wedge surfaces at their ends, co-operating wedge members on opposite sides of the shoe ends engaging said surfaces, a spacer sleeve engaging one wedge member, and a bolt having a part engaging the other wedge member and extending between the shoe ends and through the sleeve.

4. A brake comprising, in combination, a backing plate, a friction device adjacent said backing plate, a steady pin carried by the backing plate and engaged by the friction device, and centering means for the friction device mounted on said steady pin.

5. In a brake having brake shoes a combination wedge adjustment comprising a pair of wedge members acting conjointly on double wedge surfaces formed on adjacent ends of the brake shoes and wedge centering means acting thereon.

6. A brake comprising friction means having anchorage means and centering means on opposite sides of the brake, the latter having a spring urging the friction means adjacent the centering means away from the anchorage means, and thereby holding the friction means under spring-loaded tension, the brake having an adjusting device engaged by the centering means and including wedge stampings secured to the friction means, and steady-rest posts engaging said stampings and supporting the friction means laterally and on one of which the centering means is mounted.

7. A brake comprising friction means having an anchorage means and centering means on opposite sides of the brake, the latter having a spring urging the friction means adjacent the centering means away from the anchorage means, and thereby holding the friction means under spring-loaded tension, the brake having an adjusting device engaged by the centering means said adjusting device comprising a pair of wedge members acting conjointly on double wedge surfaces formed on adjacent ends of the brake shoes.

8. A brake comprising friction means having anchorage means and centering means on opposite sides of the brake, the latter having a spring urging the friction means adjacent the centering means away from the anchorage means, and thereby holding the friction means under spring-loaded tension, the brake having steady-rest posts supporting said friction means laterally and on one of which the centering means is mounted.

9. A shoe having a web and provided with a pair of separately formed wedge members secured to the end of the web and which are curved in oppositely facing partial cones having a common axis for pivotal engagement with a brake adjustment.

10. A brake comprising a shoe having a web and provided with wedge surfaces at the end of the web and which are curved in oppositely facing partial cones having a common axis, and a pair of transversely movable adjusting wedge members pivotally engaged thereby and movable toward each other along said axis to adjust the brake.

LUDGER E. LA BRIE.